June 22, 1965 D. P. RUTTER ETAL 3,190,412
ALL-METALLIC INSULATION
Filed May 25, 1960
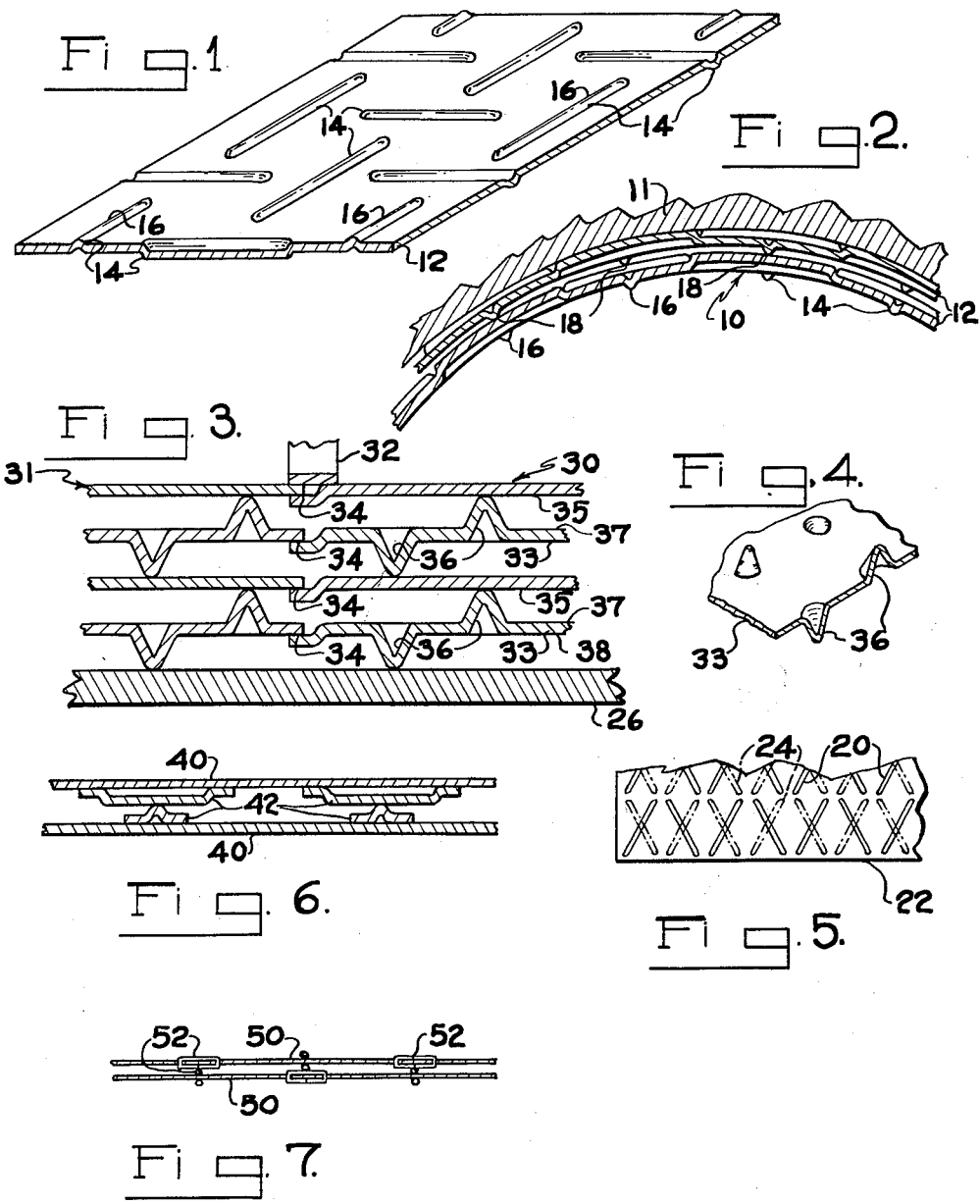
INVENTOR.
DONALD P. RUTTER
BY PAUL J. PAETZOLD
John A. McKinney
ATTORNEY

United States Patent Office 3,190,412
Patented June 22, 1965

3,190,412
ALL-METALLIC INSULATION
Donald P. Rutter, Bernardsville, and Paul J. Paetzold, Somerville, N.J., assignors to Johns-Manville Corporation, New York, N.Y., a corporation of New York
Filed May 25, 1960, Ser. No. 31,702
9 Claims. (Cl. 189—85)

This invention relates generally to thermal insulation and is particularly concerned with improvements in metallic insulations for deterring heat transfer, primarily radiant heat, in installations in which the insulations are normally subject to adverse conditions, i.e., high pressures, corrosive fluids, contamination of circulating fluids, etc.

The invention is particularly adapted for use with a variety of structures where internal insulation is desirable, such as thermal and/or chemical reaction vessels.

The interiors of some reaction vessels are subjected to high temperatures. High heat, particularly when accompanied with pressure changes and corrosive transmitted fluids, is conducive to extremely rapid oxidation, deformation, corrosion and ultimate destruction of the wall surfaces defining the vessel and the conduits in connection therewith.

Some chemical reactions are accompanied by pressure shocks which, in the presence of great heat release, dictate that the walls of the vessel, wherein the reactions occur, be fabricated of thick plates. Other reactions are also accompanied by release of particles which become entrapped and/or otherwise contaminate the system so that it becomes necessary to decontaminate the system periodically by flooding with liquid.

Various attempts have been made to develop insulation to primarily deter radiant heat transfer and which possesses the properties requisite for high temperature service, resistance to corrosion by fluids, particularly gases, and responsiveness to thermal and pressure shocks without loss of effectiveness. However, known insulations for this purpose have not exhibited all the desired combined properties of: facile and economical construction; flexibility under thermal and pressure shocks; resistance to ablation and particulate entrainment by a fluid stream; and reduced thermal conduction.

Pulverulent, granular, fibrous, or other conventional low conductivity materials which are susceptible to ablation are unsuitable for internally insulating chemical reactor systems, and the like, where particulate entrainment would contaminate the systems and/or cause adverse reactions.

It has been attempted to utilize a layer of metallic wool as an insulating medium for reaction vessels; however, it is noted that metallic wool has the propensity to "dust" (give off particles) and hence "poison" (contaminate) the vessel. Another disadvantage concomitant with the use of metallic wool is the tendency to mat or pack under pressure or other vibratory changes. Packing of the insulating medium results in uneven thermal distribution and consequent "hot spots" which accelerate the failure of the system walls. A further disadvantage of metallic wool layers is that they are not capable of being washed, by flooding with a liquid stream, without destroying the integrity of the layer.

Parallel impermeable partitions to subdivide a space into layers have been heretofore suggested to reduce heat transfer therethrough by radiation. However, such previously suggested devices have been rigidly mounted on the exterior of the surface being insulated and/or rely upon the flow of a permeating fluid over the cooler surface of the subdivided insulating body and removing the fluid from the warmer surface thereof. The important feature of such arrangements is the flowing of fluid through a subdivided layer so as to pick up the heat trying to escape. Obviously considerable heat will be lost to the permeating fluid. Furthermore, the fixed arrangement of the partitions would expose them to rupture and consequent destruction if they were to be employed to insulate the interior surface of pressure vessel walls.

In the concurrently filed commonly assigned application of Jack D. Verschoor, entitled Thermal Insulating Structure, it is suggested to provide an insulating medium comprising a plurality of heat reflective members spaced by separators having definite and defined configuration, such as knitted metal mesh, which separators are slidable in relation to the adjacent shields and which yieldably maintain the shields in spaced relation.

It is the contemplation of this invention to provide a particularly facile and economical construction and arrangement for use especially under conditions where a reduction in heat reflectivity from that of the media disclosed in the aforementioned application is not objectionable.

It is an object of this invention to provide new and improved insulation media which will withstand elevated temperatures without destruction of their integrity when subject to pressure and thermal changes.

Another object of this invention is to provide a conformable insulating structure which will readily adapt itself to the contours of the body being insulated and permit slidable movement of its constituents when subject to expansion and/or contraction.

A further object of this invention is to provide insulating media which are not deleteriously affected by chemical and/or thermal reactions.

A still further object of this invention is to provide insulating media to primarily deter radiant heat transfer, which media are lighter, more simple, facile and economical to fabricate.

The foregoing objects and others ancillary thereto are preferably accomplished, in brief, as follows:

According to a preferred embodiment of this invention, a plurality of metallic heat reflective shields are arranged in parallel layers with protuberances, in the form of embossments formed by indenting said shields, extending between said layers in a manner whereby tortuous fluid passages are defined therebetween. Specifically, the protuberances are arranged in a repetitious pattern on at least one of the broad sides of each of said shields. Each of said protuberances preferably has a longitudinal dimension and the shields are arranged in a manner whereby the longitudinal dimensions of the protuberances of one of said shields traverse the longitudinal dimensions of the protuberances of an adjacent shield. This arrangement provides an intermittent pattern of point contacts between adjacent shields which minimizes heat transfer by conduction between shields and permits the shields to move in respect to each other without rupture or loss of their effectiveness.

While the insulating media of this invention incorporate some of the features disclosed in the aforementioned Verschoor application, the type of separator and mode of separation are distinguishable from those disclosed in the Verschoor application in certain respects. Firstly, the separators of the instant invention are integral with the shields, being formed from or secured to a reflective surface thereof; however, the slidable arrangement of the shields in respect to each other is maintained. Secondly, the separator configuration of the instant invention is more simple, facile and economical to fabricate. Thirdly, since the separators are integrally formed with the shields, lighter weight media are produced. The reduced weight also contributed economically to both the media and the structure necessary to support the media. Fourthly, the embossments forming the separators in the preferred embodiment tend to reinforce the shield members without detracting appreciably from their flexible and responsive nature.

Further novel features considered characteristic of the invention are set forth with particularity in the appended claims. The invention itself, however, will best be understood from the following detailed description of specific embodiments when read in the light of the accompanying drawings, in which:

FIG. 1 is a fragmentary pictorial view of the preferred form of the heat reflective shield of this invention;

FIG. 2 is a cross-sectional elevational view of a plurality of the shields shown in FIG. 1 arranged to form a unit conformed to a circular body;

FIG. 3 is a cross-sectional elevational view of an insulating unit showing an alternate form of indentation and an arrangement of the shielding members;

FIG. 4 is a fragmentary pictorial view of one of the shields shown in FIG. 3 illustrating more clearly the conical shape of the protuberances;

FIG. 5 is a fragmentary plan view illustrating protuberances arranged in a herringbone pattern;

FIG. 6 is a cross-sectional elevational view of an alternate embodiment of the invention illustrating an alternate form of protuberance in the form of an integrally secured cleat; and FIG. 7 is a fragmentary view of another embodiment of the invention illustrating another form of protuberance.

Referring to FIG. 2, the insulating unit, generally designated by the numeral 10 and employed to primarily deter radiant heat transfer to wall 11, incorporates a plurality of heat reflective shield members 12, such as shown in FIG. 1 and which are preferably in the form of metallic foil, which may be polished aluminum or stainless steel. The shield should present surfaces of high thermal reflectivity and low thermal emissivity. The reflectivity of the shield members is preferably in the order of .5 to 1.0. The shields 12 may be comprised of one or more different types of stainless steel or other metals, with the shield nearest to the highest temperature encountered being comprised of the most heat resistant material, and having the greatest heat reflectivity propensity. The temperature and other service conditions to be encountered will govern the particular type of metal to be employed for each of the shield members.

The plurality of shields are maintained in spaced apart and parallel relation by a plurality of protuberances, shown in FIG. 1 to be in the form of embossments 14, arranged in a repetitious and preferably staggered pattern. The embossments 14 are formed on one broad face of an individual shield by indenting the opposite broad face. The embossments 14 are shown to be arranged in rows disposed parallel to an edge of the shield sheet 12. However, the embossments, or other protuberances, may be diagonally disposed relative to an edge of a sheet. The embossments 14 are also each preferably longer in one dimension or direction than in others and have a peak terminus 16 generally forming a longitudinal line. Adjacent shields within the unit 10 are preferably arranged to have the longitudinal dimension of the protuberances of one shield traverse the longitudinal dimension of the protuberances of an adjacent shield, as illustrated in FIG. 2, thus providing an intermittent pattern of what may be generally described as point contact 18 between termini 16.

A longitudinally extending configuration for the protuberances is preferred for the reasons that the least amount of reflective surface is disrupted and the intersections of the protuberances of one shield with the protuberances of an adjacent shield form point contacts as opposed to surface contacts. It will be apparent, however, that other configurations may be employed where the insulating requirements for heat transfer by radiation and/or conduction are less stringent. Such other configurations may be conical as disclosed in FIGS. 3 and 4, spherical, etc., and may be employed in combination with each other or with the preferred configuration.

While the protuberances are shown in FIG. 1 to be longitudinally aligned in rows, the protuberances may be arranged in any suitable pattern which will restrict the fluid flow between the layers of shields. An example of such alternate pattern is shown in FIG. 5 where the embossments 20 are arranged in a herringbone pattern on shield 22. The engaging protuberances 24 of an adjacent shield are represented in phantom lines.

Since the protuberances, in the form of embossments, form an integral part of the shield members, a more facile and economical construction is provided than any heretofore suggested. This construction is also lighter in weight and hence results in a further economical advantage in that the supporting superstructure need not be as substantial as required for other types of construction.

Any suitable retention means including well known types, may be employed to retain insulating units to the wall of the body being insulated, such as wall 26 in FIG. 3. The retaining means disclosed therein is a metallic annular strap 32 superposed over overlapping units 30 and 31. The terminus of each shield member 33 or 35 of a leading unit 30 is recessed to provide a bearing seat 34 for the corresponding shield of the next unit 31. Shields 33 are provided with conical indentations 36 extending from both faces 37 and 38, while shields 35 have no appendages. This arrangement provides a substantially continuous reflective surface comprised of several sections at the same plane level. In some internal installations, such as pipes, the resiliency of the metallic foil forming the shielding members may be sufficient to retain the shields in position. In other installations where the slidable feature is not critical, the plurality of shields at the same plane level may be joined together by weldments.

As shown in FIG. 3, the adjacent shield members are not rigidly secured and hence are free to slide one upon another in response to thermal and/or pressure changes. This arrangement is particularly advantageous in systems where intermittent thermal and/or pressure changes are encountered in order to provide a construction which will not rupture and destroy its insulating qualities.

It will be readily apparent that the conical form of protuberance shown in FIG. 3 is but one form that may be used in the thermal insulating media of this invention and that any of the other forms illustrated in the several figures may be substituted. The several forms also may be used in combination with each other.

While it is preferred to have the protuberances in the form of indented embossments, where service conditions require that materials be employed which are not readily drawn and/or more heat by conduction may be tolerated, the protuberances may be in the form of appendages integrally secured to the shielding members. These appendages may be in the form of hollow cleats 42 as illustrated in FIG. 6, or the like, and preferably arranged in a repetitious and staggered pattern on shields 40 in the manner of indentations 14 in FIG. 1.

Another embodiment of a protuberance in the form of an appendage is illustrated in FIG. 7, wherein metallic inserts in the form of staples 52 having a circular cross-section are inserted into the shields 50 and arranged in an alternating and repetitious pattern.

Although certain and specific embodiments of the invention have been shown and described, various other modifications thereof are possible. Therefore, this invention is not to be restricted except as necessitated by the prior art and by the spirit of the appended claims.

What we claim is:

1. A thermal insulating media comprising a plurality of metallic heat reflective shields arranged in sets, each set comprising: a plurality of shields arranged in parallel layers, and protuberances of definite and defined configuration extending between said layers and being integral with at least one of said shields, said protuberances maintaining said shields in spaced but yieldable relation, the shields in one set having recessed termini to provide bearing surfaces for the shields of the next adjacent set and to position the reflective surfaces of the shields of said adjacent set on the same plane with the reflective surfaces of said one set.

2. A thermal insulating media comprising a plurality of metallic heat reflective shields arranged in sets, each set comprising: a plurality of shields arranged in parallel layers, and protuberances of definite and defined configuration extending between said layers and being integral with at least one of said shields, said protuberances maintaining said shields in spaced but yieldable relation; the shields in one set having recessed termini to provide bearing surfaces for the shields of the next adjacent set and to position the reflective surfaces of the shields of said adjacent set on the same plane with the reflective surfaces of said one set, at least one of said shields in each set having a greater heat reflectivity propensity than other of said shields in said set and the other of said shields in each of said sets being arranged in progressively diminishing sequence according to their respective heat reflectivity propensity.

3. A thermal insulating medium as described in claim 1, wherein said protuberances are arranged in a repetitious pattern on at least one of the broad sides of one of said shields, each of said protuberances having a longitudinal dimension, and said shields being arranged with the longitudinal dimension of the protuberances of one of said shields traversing the longitudinal dimension of the protuberances of an adjacent shield to minimize heat transfer by conduction from said one shield to said adjacent shield.

4. A thermal insulating medium as described in claim 3, wherein said protuberances on one of said shields are arranged in rows with alternate protuberances within a row, with respect to each other, extending in traversing directions.

5. A thermal insulating medium as described in claim 3, wherein said protuberances are arranged in a row to form a herringbone pattern.

6. A thermal insulating medium as described in claim 1, wherein said protuberances are in the form of embossments.

7. A thermal insulating medium as described in claim 1, wherein said protuberances are in the form of appendages.

8. A thermal insulating medium as described in claim 7, wherein said appendages are in the form of hollow cleats.

9. A thermal insulating media as described in claim 7, wherein said appendages extend through their respective shields to form protuberances on both sides of a shield.

References Cited by the Examiner

UNITED STATES PATENTS

| | | | |
|---|---|---|---|
| 2,180,373 | 11/39 | Sibley et al. | 189—34 |
| 2,432,445 | 12/47 | Roe. | |
| 2,738,297 | 3/56 | Pfistershammer | 189—34 X |
| 2,858,247 | 10/58 | De Swart | 189—34 X |
| 2,944,328 | 7/60 | Adams | 189—34 X |

FOREIGN PATENTS 379,389　9/32　Great Britain.

RICHARD W. COOKE, Jr., *Primary Examiner.*

JACOB L. NACKENOFF, CORNELIUS D. ANGEL, *Examiners.*